United States Patent [19]

Konno

[11] Patent Number: 4,753,036
[45] Date of Patent: Jun. 28, 1988

[54] INDOOR MULTIPLE-PURPOSE HYDROPONIC CULTIVATION PLANTER

[75] Inventor: Eizan Konno, Tokyo, Japan
[73] Assignee: Takenaka Kohmuten Co., Ltd., Japan
[21] Appl. No.: 21,301
[22] Filed: Mar. 3, 1987
[30] Foreign Application Priority Data
  May 9, 1986 [JP] Japan .............................. 61-069606[U]
[51] Int. Cl.⁴ .............................................. A01G 31/00
[52] U.S. Cl. .......................................... 47/59; 47/66; 47/86
[58] Field of Search .................... 47/59, 66, 60, 82, 83, 47/85, 86, 39, 72, 65; 220/234

[56] References Cited

U.S. PATENT DOCUMENTS

| | | | |
|---|---|---|---|
| 695,484 | 3/1968 | Parker | 47/86 |
| 1,993,620 | 3/1935 | Otwell | 217/86 |
| 3,120,152 | 2/1964 | Horn et al. | 220/23.4 |
| 4,133,141 | 1/1979 | Lee | 47/59 |
| 4,145,841 | 3/1979 | Woolpert | 47/86 |

FOREIGN PATENT DOCUMENTS 59-83335 6/1984 Japan.
8102087 8/1981 PCT Int'l Appl. ............... 47/86

Primary Examiner—Robert A. Hafer
Assistant Examiner—Bradley M. Lewis
Attorney, Agent, or Firm—Ronald P. Kananen

[57] ABSTRACT

An indoor multiple purpose hydroponic cultivation planter is a non-water-leaking structure including an upper opening for a plant and a side surface having a coupling opening for a rootstock of said plant. A plurality of planters are coupled to each other via the coupling openings and positioned in a desired arrange pattern, each the planter receives porosity grain fillers and water. The plant is cultivated in at least one of the planters.

13 Claims, 8 Drawing Sheets

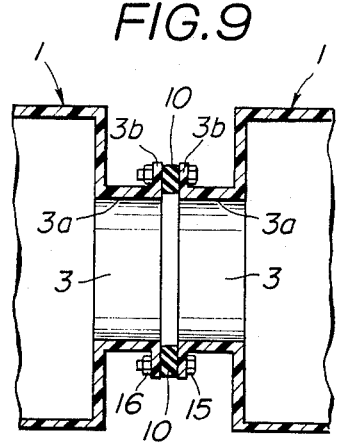
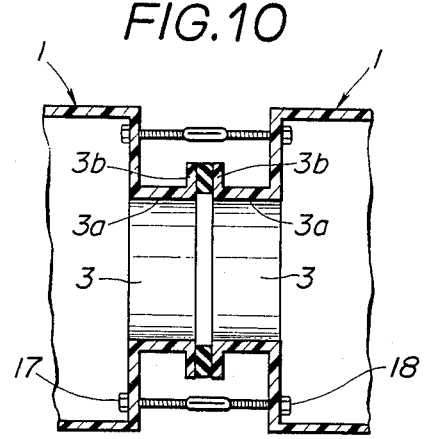
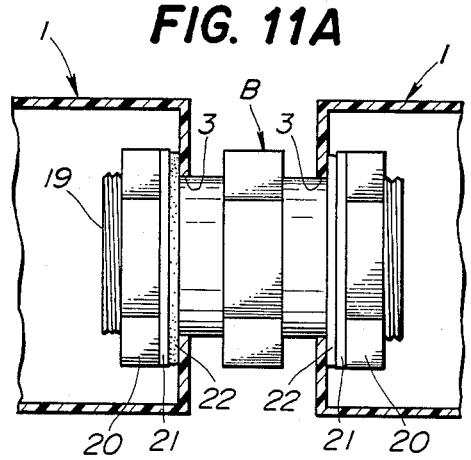
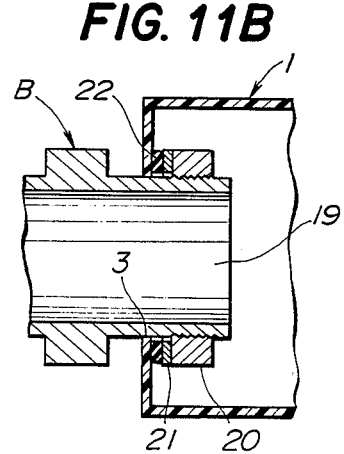
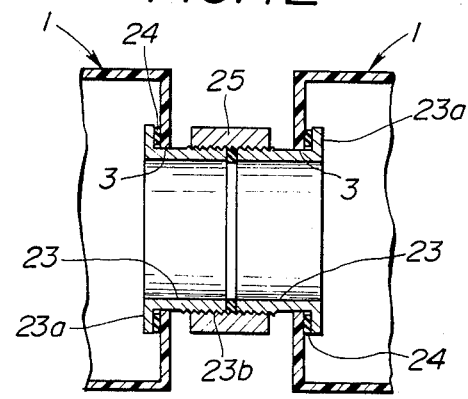

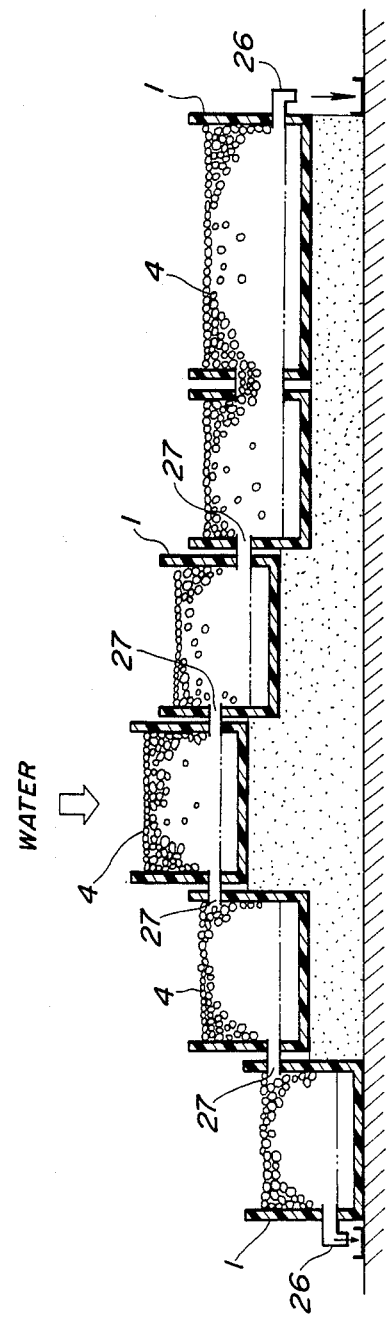

INDOOR MULTIPLE-PURPOSE HYDROPONIC CULTIVATION PLANTER

BACKGROUND OF THE INVENTION

The present invention relates to an indoor hydroponic cultivation planter which is used for forming indoor green ornamentation by increasing greens of hydroponically cultivated foliage plants or the like in general homes, offices, public spaces, etc., and more specifically to an indoor multiple-purpose hydroponic cultivation planter which is capable of many arrangement pattern variations thereof suitable to indoor conditions and is possible to be designed in combination with indoor furniture and utensils.

It is common to position a pot type planter having a foliage plant so as to increase greens indoors. However, in this type planter, the root area of the plant as the plant environment is limited to the size of the pot. Since the weight of the pot increases many times if the root area is desired to be expanded, the pot is not suitable to the indoor use in which the light weight is required. If the root area is limited, the tree growth is suppressed within this limitation and it is difficult for the greens to occupy a large indoor space. In addition, the conventional pot type planter has an individual construction, so that it is not suited to multiple-usages and multiple-purposes in combination with the indoor furniture and utensils.

Another prior art practice is to cultivate the indoor plants with a sort of hydroponic cultivation instead of soil cultivation, i.e., to form the indoor green ornamentation with the foliage plants cultivated by so-called hydroculture. In this instance, it is common to position the pot on a table or a carpet. This prior art practice has the same disadvantges as the above-described pot type planter.

Another prior art device is a multiple-purpose planter which has a knockdown type construction for increasing the greens on an outdoor artificial base, such as a rooftop of a building or a terrace of a house. This prior art has multiple-purpose to be capable of various kinds of plant cultivation designs by growing a big tree and forming the green ornamentation in conjunction with a bench, a stand or a flower bed. This multiple-purpose planter is useful, because the trees can grow up, a large amount of the greens can be maintained, the planter can be used for many objects, such as the bench or the stand, many kinds of plant designs are possible, and it is possible to change the design after completion. However, such a multiple-purpose planter is not suitable to the indoor usage, since the indoor plants are cultivated basically with earth.

Water management is difficult in a case of cultivating the plants with earth indoors. It is not proper to apply too much water, which will spoil the roots, or of course, too little water. A basic component would appear on the surface of earth in the planter and form a thin layer. This layer may be a cause to spoil the plants. Thus, it is necessary with an indoor plant to apply enough water to wash the basic component and to remove excess water on all such occasions so as to prevent the roots from spoiling. However, in general, it is not acceptable, for aesthetic reasons, to provide a waste pipe indoors to drain surplus water from the planter.

There are many arrangement variations in this multiple-purpose planter, but the basic design is that the arrangement expands from the center of the plant box and there is no flexibility in design. Moreover, this multiple-purpose planter is constructed as an indoor fixture after setting once, and thereby it is not easy to disjoin and remove the planter. It is well known to take a few months for digging around the root of the tree before transplanting, and only a specialist can do so.

SUMMARY OF THE INVENTION

According to an indoor multiple-purpose hydroponic cultivation planter of the present invention, the aforementioned disadvantages of the prior art are avoided by the following construction. The planter is a non-water-leaking construction which includes an upper surface having an opening for a plant, and a side surface having a coupling opening the size of which is enough to pass the rootstock of the plant. A plurality of planters are joined in sealed relationship to each other through the coupling openings thereof in a desired arrangement pattern. Each of the planters receives predetermined amounts of water and porosity grain fillers, such as foaming brick stones, and desired plants are set in entire or a part of the planters.

In the hydroponic cultivation planter, no earth is used and it is not apprehended to appear a basic component. Thus, it is possible to fill the planter to repletion with water, it is not necessary to manage surplus water, and the plant is free from insects and smell. Therefore, this planter is proper for the indoor plants. Since the plurality of planters are coupled as one group through the coupling openings, if the water is supplied to one of the planters, all the planters receive the water. The porosity grain fillers are provided in the planter, so that each the filler contains the water via a so-called capillary phenomenon even if the water supply level is very low. As the water level decreases, the contained water is disgorged for the resupplement. Thus, the interval of the water replenishment is a range from two weeks to four weeks, and not much labor is required for the maintenance.

The foaming grain fillers are characterized by containing the water, supplied and further by containing air after the water is disgorged, which is different from earth. Thus, the rootstocks of the plants are exposed to the air properly, so that there is no possibility of spoiling the roots. In addition, as the plants grow up, the rootstocks thereof expand to other planters of the group through the coupling openings, thereby being able to grow the plants large and keep much foliage. If the plant size is small, flowering plants may be cultivated in each the planter as the flower bed.

Each planter is a so-called individual water vessel, and it is unnecessary to dig up the roots of the tree before transplanting. The porosity grain fillers do not make the surrounding thereof dirty, unlike earth, and they are easy in handling. The planters have a flexibility for separation and movement. Thus, there are many variations in the ornamentation design. Each planter may be used for multiple purposes in common homes, offices, lobbies or public spaces by combining them with the indoor furnishings and utensils, such as sofas and tables.

It is therefore one object of the present invention to provide an indoor multiple-purpose hydroponic cultivation planter which it is possible to arrange in various kinds of patterns.

It is another object of the present invention to provide an multiple-purpose hydroponic cultivation planter which can be combined with indoor furnishings and utensils.

It is a further object of the present invention to provide an improved multiple-purpose hydroponic cultivation planter which can grow up plants large to increase foliage indoors.

It is an additional object of the present invention to provide an improved multiple-purpose hydroponic cultivation planter which is easy in maintenance.

Other objects, advantages and features of the present invention will become apparent to those having ordinary skill in the art from a reading of the following detailed description when taken in conjunction with the accompanying drawings.

BRIEF DESCRIPTION OF THE DRAWINGS

FIGS. 9 through 12 depict cross sectional views of planter coupling means according to the present invention; and FIG. 13 is a cross sectional view of another embodiment according to the present invention.

DETAILED DESCRIPTION OF THE INVENTION

Figure 1:
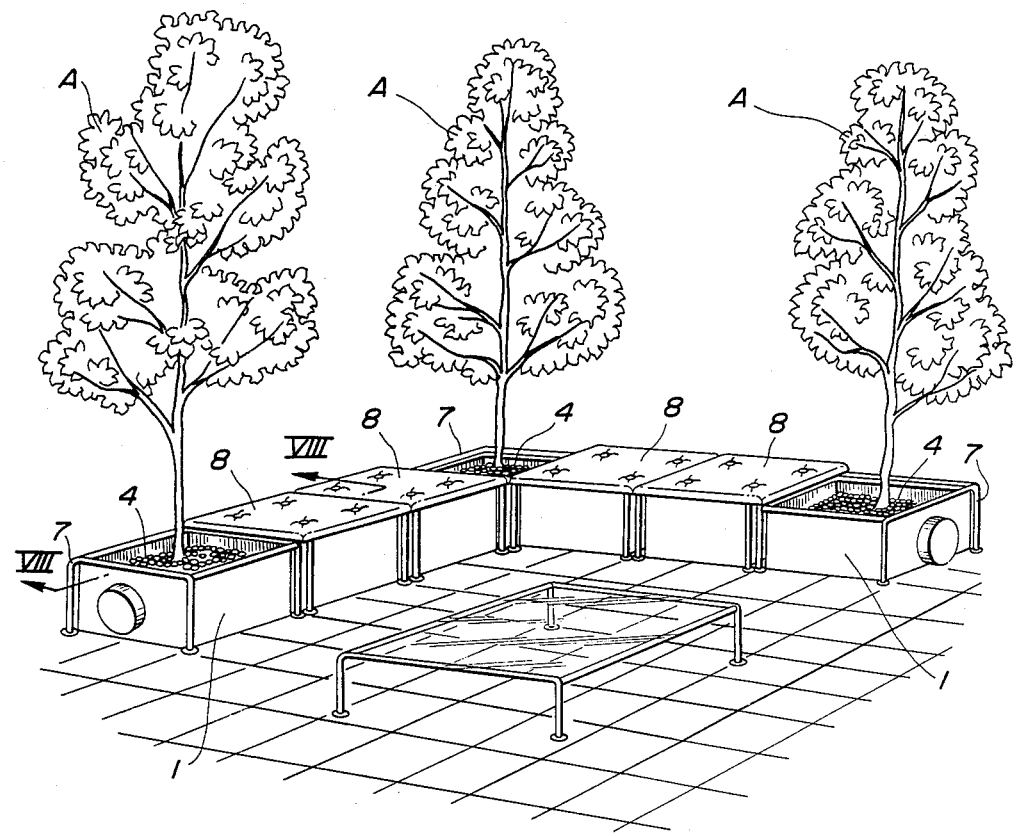
FIGS. 1 and 2 depict perspective views of preferred embodiments of an indoor multiple-purpose hydroponic cultivation planter according to the present invention.
Figure 2:
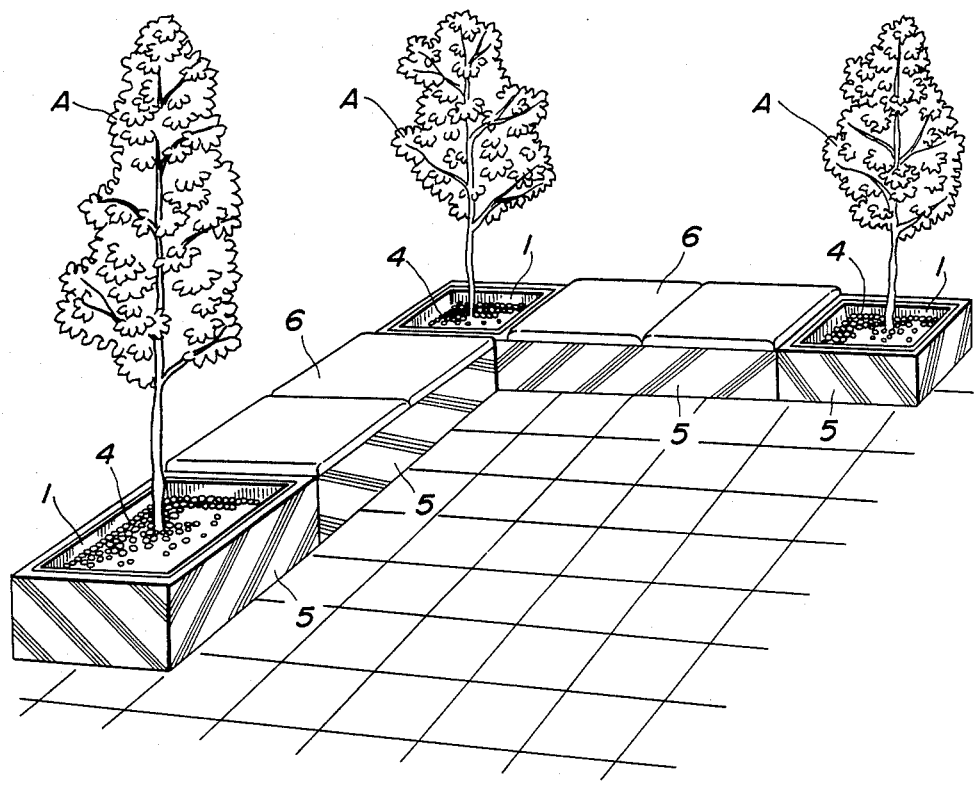

Referring now to FIGS. 1 and 2, there are shown embodiments of a multiple-purpose hydroponic cultivation planter according to the present invention, these embodiments serveing as a seat and being combined with a table. In the drawings, a reference "A" represents a hydroponically cultivated plant.

In FIG. 1, steel frames 7 are positioned so as to surround each the planter 1. Cushions 8 are put on steel frames 7 surrounding the planters 1 except for the planters cultivating the plants A, so that the seats are formed. In FIG. 2, each planter 1 is accommodated in a smoothly planed box 5, and covers 6 are put on the boxes 5 for receiving the planters 1 except for the planters cultivating the plants A. Thus, these covers 6 serve as the seats.

Figure 3:
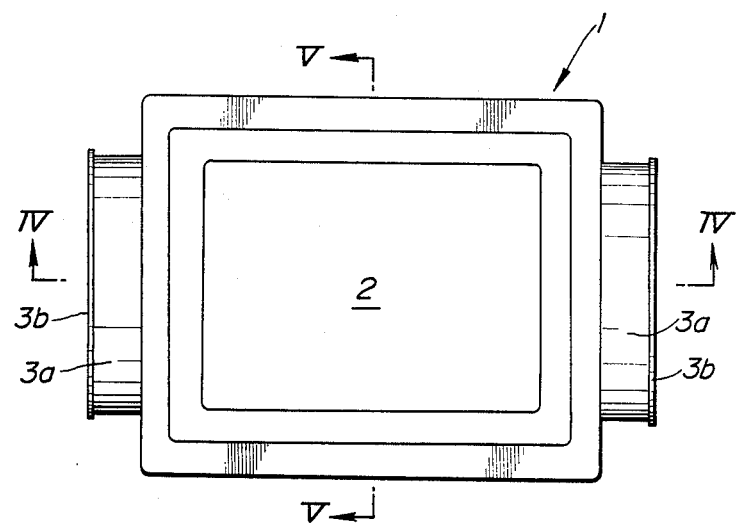
FIG. 3 is a plan view of a single planter of one embodiment according to the present invention.
Figure 4:
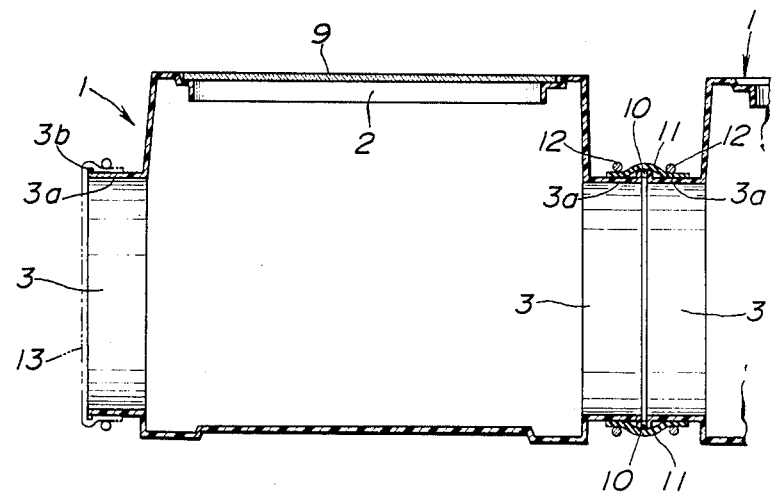
FIG. 4 is a cross sectional view along lines IV—IV in FIG. 3.
Figure 5:
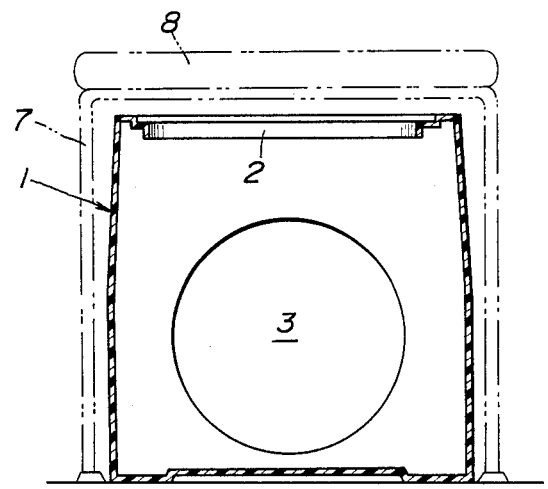
FIG. 5 is a cross sectional view along lines V—V in FIG. 3.

FIGS. 3 through 5 illustrate one example of a shape and structure of the single planter 1. The planter 1 is a substantially cubic or rectangular non-water-leaking structure which includes an upper opening 2 for cultivating the plant A and side surface portions having coupling openings 3. The size of the opening 3 is enough to pass freely the rootstock of the plant A regardless of the growth thereof. The material of the planter 1 is strong, hard and light Fiber-Reinforced-Plastic (FRP) which has corrosion resistance against water and manure. However, the material is not limited to this and may be normal synthetic resins or metal, such as aluminum. The planter 1 is as large as about 400×350×300 mm, its average thickness is 2.4 mm, and the caliber of the coupling opening 3 is 200 mm.

There are various arrangements of the planters 1 in the plan view. For example, the L-shaped planter may be arranged at the corner portion, and the width of the planter arranged at the straight portion may be two or three times as long as the normal width. In addition, the plan shape of the planter 1 may be any desired shape, such as triangle, hexagon, other polygon, circle or ellipse.

Figure 6:
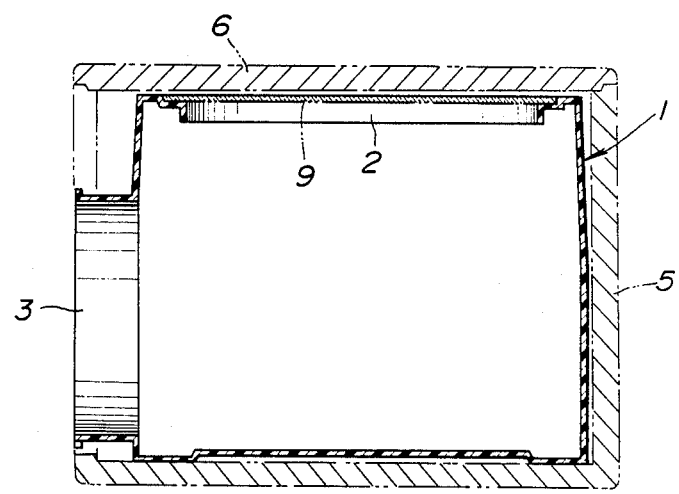
FIG. 6 is a cross sectional view of another embodiment according to the present invention.
Figures 7A, 7B:
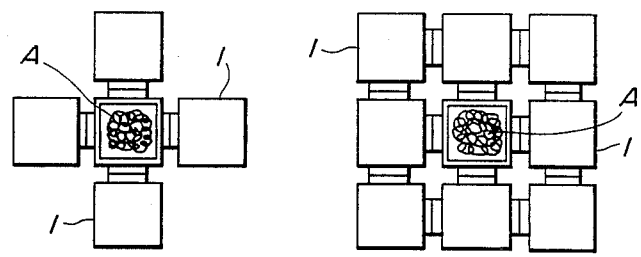
FIGS. 7A through 7D depict various kinds of arrangement patterns of planters according to the present invention.
Figure 7C:
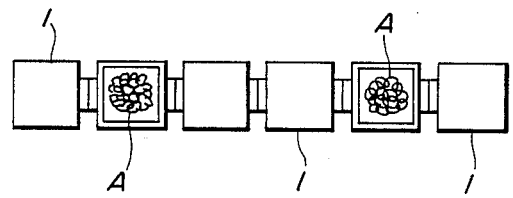
Figure 7D:
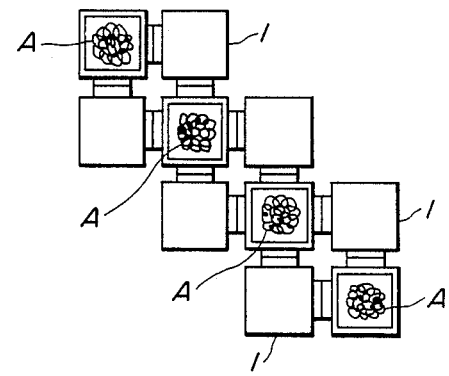

A pair of the coupling openings 3 may be provided symmetrically at the side wall portions of the planters 1 facing each other as shown in FIG. 4. The coupling opening 3 may be provided at only one side surface of the planter 1 as the end part of the arrangement pattern as shown in FIG. 6. In addition, it may be possible to provide the coupling openings 3 at all four side surfaces or at three side surfaces. Since there are many kinds of shapes and structures of the planters 1, the arrangement pattern would be flexible and the manufacturing would be easy as discussed hereinafter.

A plurality of planters 1 may be joined in a desired arrangement pattern by facing the adjacent coupling openings 3 toward one another and connecting them to seal up as shown in FIG. 4. Thus, the multiple-purpose hydroponic cultivation planter can be obtained for indoor green ornamentation. For simply connecting the coupling openings 3—3 to each other in seal, flanges 3b extending outwardly are formed at the end portions of pipes 3a of the coupling openings 3, waterproof packings 10 are inserted between the flanges 3b—3b, waterproof rubber bands 11 seal the outsides of the pipes 3a, and bands 12 are fastened as shown in FIG. 4. However, a waterproof adherent tape may be used for the connection instance of the waterproof packing 1. In this instant, the band 12 is not needed. By connecting a predetermined number of the planters with such a non-water-leaking connection method, various kinds of the arrangement patterns of the indoor multiple-purpose hydroponic cultivation planters would be accomplished as shown in FIGS. 7A through 7D. FIG. 4 illustrates that the unused coupling opening 3 at the end planter 1 of this arrangement pattern is closed by a side cover 13 which is easy to be attached and removed.

Figure 8:
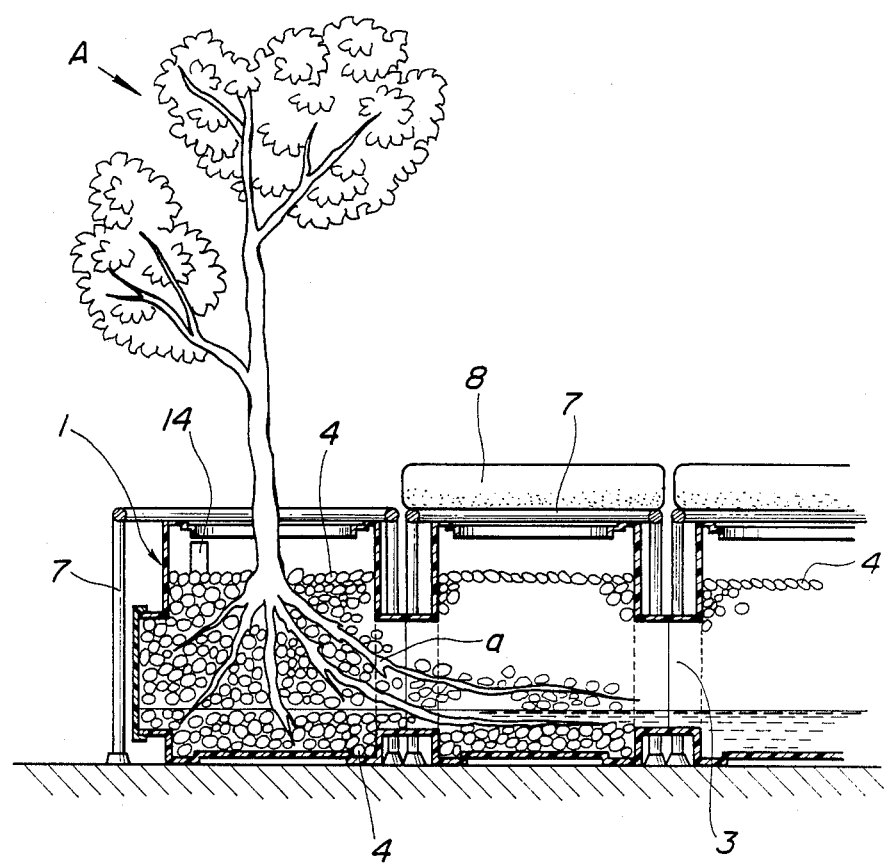
FIG. 8 is a cross sectional view of a plurality of coupled planters according to the present invention.

Porosity grain fillers 4 are put in each planter 1 connected in the arrangement pattern, the depth of the fillers 4 being within a range between 50 and 80 percent of the planter height. The maximum water level is about 5 cm from the bottom of the planter 1. The plant A is cultivated hydroponically by using the grain fillers 4 (refer to FIG. 8). Foaming brick stones called artificial pumice stones are proper for the prosity grain fillers (hydroballs) 4, the foaming brick stones being formed by calcining them at a high temperature about 1200 degrees centigrade.

A hydrograph 14 is set in the planter 1 (refer to FIG. 8) which is used when supplying the water as occasion demands. The planters 1 in the same group are coupled to each other via the coupling openings 3, so that the water flows to all the planters if the water is supplied to one planter. Thus, it is easy to manage the water supply. The next water supply is necessary after about one week has passed since the hydrograph 14 indicates zero because of the dryness of the evaporation and the absorption of the plant A. Then, the porosity grain fillers 4 disgorge all the water contained therein, and the porosity portions thereof will absorb the air. As a result, sufficient air and water are applied to the rootstock of the plants A in a balanced ratio.

As the plants A to be cultivated, almost all of foliage plants and flower plants may be proper to be cultivated hydroponically. For example, the following are proper: deciduous trees, such as ginkgo trees and zelkova trees; evergreen trees, such as camphor trees and oak trees; bamboo; rosebay; azaleas; box trees; Philodendron Schott and Dieffenbachia Schott of the color asia antiquorum family; Collinia Liebm and Chrysalidocarpus H. Wendl of the cocos nucifera family; Ficus L. of the morus family; Dracaena L. and Chlorophytum Ker-Gawl. of the lilium family; Adiantum L. and Nepbrolepis of the Polypodiaceae family; centpolia; cyckamen indicum; and dendroviewm.

The upper portion of the planter 1 excluding the plant may be opened to cultivate flower plants for forming the flower bed, or may be covered with a transparent acryloyl plate 9 to see the inside through it, this plate serving as the seat (refer to FIGS. 4 and 6).

The connection between the coupling openings 3 of the planters 1 may be accomplished as follows:

(1) The waterproof packing 10 is, as shown in FIG. 9, inserted between the flanges 3b of the pipes 3a forming the coupling openings 3 of the planters 1, and the flanges 3b are fixed to each other by screw bolts 15 and nuts 16.

(2) As shown in FIG. 10, the side walls of the planters 1 are ganged with each other by long screw bolts 17 and nuts 17 after the waterproof packing 10 is inserted between the flanges 3b.

(3) In FIGS. 11A and 11B, a coupler 19, inserted into the coupling openings 3 of the adjacent planters 1, is a cylinder pipe which is able to be clamped at the center portion thereof and has reverse threads of the screws at the both end portions. Nuts 20 are mounted at both the end thread portions for pushing packings 22 via washers 21.

(4) In FIG. 12, a pair of cylindrical pipe joints 23 include stopper flanges 23a at one end and threads at the outside of the other end. The joints 23 are inserted into the coupling openings 3 through waterproof packings 24, and the joints 23 are toward each other to be connected with a coupler 25.

FIG. 13 shows another embodiment wherein the planters 1 are positioned on places having different heights, such as a mound formed indoors. In the adjacent planters 1, the higher level planter 1 is connected at the water supply level to the lower level planter 1 through a coupling pipe 27, and the lowest level planter has a draining nozzle 26 for disgorging the surplus water. If sufficient water is supplied to the highest level planter 1, all the planters receive the water and retain it up to the water supply level in each. Thus, it is possible to save time supplying the water. The coupling pipe 27 may be an individual type or may be constructed by connecting the coupling openings 3. According to this embodiment, the foliage can be increased on the indoor mound with hydroponic cultivation. Moreover, this embodiment can be applied to a staircase and a slope to increase the foliage.

As discussed hereinbefore, the multiple purpose hydroponic cultivation planter of the present invention uses water instead of earth, so that it is free from insects and smell. It is necessary to supply the water once a week and thereby saves time in maintaining the plants. Anybody can handle the planter easily, and this planter is well suited to increase the greens indoors. In addition, the planter of this invention is light, and it is not necessary to reinforce and waterproof the floor. It is easy to make a large size green ornamentation. Since the root area is not limited and the rootstock a can extend freely, it is possible to grow a large tree and make the indoor space have plenty of foliage. There are many connection arrangement patterns in this multiple purpose planter. Thus, it is possible to make a large green area in accordance with the indoor space by designing and building the green ornamentation freely. Moreover, the planter of the present invention can be used for multiple purposes, such as with benches, seats, stands or the like by combining the planters with the furnishings and utensils, and thereby satisfying the diversification and multiple purposes of the ornamentation design.

While I have shown and described herein the preferred embodiments of my invention, it will be apparent to those skilled in the art that many changes and modifications may be made without departing from my invention in its broader aspects. Therefore, the scope of the present invention should be determined only by the following claims.

I claim:

1. An indoor multiple purpose hydroponic cultivation planter structure comprising a plurality of planters adapted to receive porous grain fillers and water, each said planter being a non-water-leaking structure including an upper opening through which a plant can be inserted and a side surface having a coupling opening through which a rootstock of a plant can extend, said planters being positioned in a desired pattern and coupled to each other via said coupling openings, said planter structure further comprising a frame positioned around each said planter, a main portion of a plant positioned in at least one of said planters and seating means positioned over the upper opening of at least one of the other of said planters, said seating means comprising a cover supported by said frame.

2. An indoor multiple purpose hydroponic cultivation planter structure according to claim 1, wherein the frames are made of steel.

3. An indoor multiple purpose hydroponic cultivation planter structure according to claim 1, further comprising means for coupling said plurality of planters to each other, said coupling means comprising a flange provided around each said coupling opening, each flange projecting from a side surface of a planter and terminating in an edge, a waterproof packing positioned between the edges of facing flanges of adjacent planters, and a waterproof elastic band covering said waterproof packing.

4. An indoor multiple purpose hydroponic cultivation planter structure according to claim 1, further comprising means for coupling said plurality of planters to each other, said coupling means comprising a flange provided around each said coupling opening, each flange projecting from a side surface of a planter and terminating in an edge, and a waterproof packing positioned between the edges of facing flanges of adjacent plants, and screw means for fastening said adjacent planters to each other.

5. An indoor multiple purpose hydroponic cultivation planter structure according to claim 1, further comprising means for coupling said plurality of planters to each other, said coupling means comprising at least one pipe having screw threads at at least one end thereof, waterproof packings and nuts, said pipe being coupled via said waterproof packings to facing coupling openings of adjacent planters, and said nuts ensuring the coupling via said waterproof packings.

6. An indoor multiple purpose hydroponic cultivation planter structure according to claim 1, wherein said planters are positioned at different heights, whereby water poured into higher planters flows to lower planters.

7. An indoor multiple purpose hydroponic cultivation planter structure comprising a plurality of planters adapted to receive porous grain fillers and water, each said planter being a non-water-leaking structure including an upper opening through which a plant can be inserted and a side surface having a coupling opening through which a rootstock of a plant can extend, said planters being positioned in a desired pattern and coupled to each other via said coupling openings, said planter structure further comprising at least one box structure having an upper opening to receive at least one said planter, a main portion of a plant positioned in at least one of said planters, and seating means positioned over the upper opening of at least one of the other planters, said seating means comprising a cover supported by said box structure.

8. An indoor multiple purpose hydroponic cultivation planter structure according to claim 7, wherein the box structure has a smoothly planed surface.

9. An indoor multiple purpose hydroponic cultivation planter structure according to claim 7, further comprising means for coupling said plurality of planters to each other, said coupling means comprising a flange provided around each said coupling opening, each flange projecting from a side surface of a planter and terminating in an edge, a waterproof packing positioned between the edges of facing flanges of adjacent planters, and a waterproof elastic band covering said waterproof packing.

10. An indoor multiple purpose hydroponic cultivation planter structure according to claim 7, further comprising means for coupling said plurality of planters to each other, said coupling means comprising a flange provided around each said coupling opening, each flange projecting from a side surface of a planter and terminating in an edge, a waterproof packing positioned between the edges of facing flanges of adjacent planters, and screw means for fastening said adjacent planters to each other.

11. An indoor multiple purpose hydroponic cultivation planter structure according to claim 7, further comprising means for coupling said plurality of planters to each other, said coupling means comprising at least one pipe having screw threads at at least one end thereof, waterproof packings and nuts, said pipe being coupled via said waterproof packings to facing coupling openings of adjacent planters, and said nuts ensuring the coupling via said waterproof packings.

12. An indoor multiple purpose hydroponic cultivation planter structure according to claim 7, wherein said planters are positioned at different heights, whereby water poured into higher planters flows to lower planters.

13. A planter comprising a plurality of modules, each module defining a container having an upper opening through which a plant can be inserted and a side surface having a coupling opening, said modules being positioned in a desired pattern, said planter further comprising means coupling the coupling openings of the modules to one another, and seating means positioned over the upper opening of at least one of said modules, said seating means comprising a cover for said upper opening.

* * * * *